(12) United States Patent
Bakalash et al.

(10) Patent No.: US 10,991,147 B1
(45) Date of Patent: Apr. 27, 2021

(54) CREATING COHERENT SECONDARY RAYS FOR REFLECTIONS IN HYBRID RAY TRACING

(71) Applicant: ADSHIR LTD., Shdema (IL)

(72) Inventors: Reuven Bakalash, Shdema (IL); Ron Weitzman, Livnim (IL)

(73) Assignee: ADSHIR LTD., Shdema (IL)

( * ) Notice: Subject to any disclaimer, the term of this patent is extended or adjusted under 35 U.S.C. 154(b) by 0 days.

(21) Appl. No.: 16/874,705

(22) Filed: May 15, 2020

Related U.S. Application Data

(63) Continuation of application No. 16/844,681, filed on Apr. 9, 2020.

(60) Provisional application No. 62/957,157, filed on Jan. 4, 2020.

(51) Int. Cl.
*G06T 15/06* (2011.01)
*G06T 13/40* (2011.01)

(52) U.S. Cl.
CPC .............. *G06T 15/06* (2013.01); *G06T 13/40* (2013.01); *G06T 2210/12* (2013.01)

(58) Field of Classification Search
CPC .................................................... G06T 15/06
See application file for complete search history.

(56) References Cited

U.S. PATENT DOCUMENTS

| | | | |
|---|---|---|---|
| 6,359,618 B1 | 3/2002 | Heirich | |
| 6,911,984 B2 | 6/2005 | Sabella | |
| 6,967,663 B1 | 11/2005 | Bastos | |
| 7,969,434 B2 * | 6/2011 | Peterson | G06T 15/005 345/419 |
| 8,570,322 B2 | 10/2013 | Hanika | |
| 9,424,685 B2 | 8/2016 | Howson | |
| 9,569,559 B2 | 2/2017 | Karras | |
| 9,576,389 B2 | 2/2017 | Lee | |
| 9,607,426 B1 * | 3/2017 | Peterson | G06T 15/06 |
| 9,672,654 B2 | 6/2017 | Shin | |
| 9,691,177 B2 | 6/2017 | Silvennoinen | |
| 9,697,640 B2 | 7/2017 | Obert | |
| 9,984,492 B2 | 5/2018 | Obert | |
| 10,026,213 B1 * | 7/2018 | Arbree | G06T 15/06 |
| 10,297,068 B2 | 5/2019 | Bakalash | |
| 10,332,304 B1 | 6/2019 | Bakalash | |
| 10,360,720 B1 * | 7/2019 | Nevraev | G06T 15/506 |
| 10,380,785 B2 | 8/2019 | Bakalash | |
| 10,410,401 B1 | 9/2019 | Bakalash | |
| 10,565,776 B2 | 2/2020 | Bakalash | |
| 2005/0179686 A1 * | 8/2005 | Christensen | G06T 15/06 345/423 |
| 2007/0035545 A1 * | 2/2007 | Hempel | G06T 15/06 345/422 |

(Continued)

OTHER PUBLICATIONS

Wald et al., "Interactive Rendering with Coherent Ray Tracing", Computer Graphics Forum, vol. 20, Sep. 2001, pp. 153-165.

(Continued)

*Primary Examiner* — Phong X Nguyen
(74) *Attorney, Agent, or Firm* — May Patents Ltd. c/o Dorit Shem-Tov

(57) ABSTRACT

Hybrid ray tracing method for generating photorealistic reflections while keeping coherence of secondary rays. The coherence is achieved by handling secondary rays with collective origin and collective destination, attaining high parallelism and high utilization of GPU.

15 Claims, 14 Drawing Sheets

(56) References Cited

U.S. PATENT DOCUMENTS

| | | | |
|---|---|---|---|
| 2008/0074416 A1 | 3/2008 | Brown | |
| 2008/0074420 A1* | 3/2008 | Kuesel | G06T 15/50 345/426 |
| 2008/0231627 A1 | 9/2008 | Shearer | |
| 2009/0073167 A1 | 3/2009 | Brown | |
| 2009/0102844 A1* | 4/2009 | Deparis | G06T 15/50 345/426 |
| 2009/0128552 A1 | 5/2009 | Fujiki | |
| 2009/0128562 A1 | 5/2009 | McCombe | |
| 2009/0167763 A1 | 7/2009 | Waechter | |
| 2009/0213115 A1 | 8/2009 | Keller | |
| 2009/0219286 A1* | 9/2009 | Wei | G06T 15/005 345/424 |
| 2009/0256836 A1* | 10/2009 | Fowler | G06T 15/506 345/419 |
| 2010/0033493 A1* | 2/2010 | Nutter | G06T 15/06 345/589 |
| 2010/0053162 A1 | 3/2010 | Dammertz | |
| 2010/0079457 A1* | 4/2010 | Tavenrath | G06T 15/06 345/426 |
| 2010/0194751 A1* | 8/2010 | Wald | G06T 15/06 345/426 |
| 2011/0066682 A1 | 3/2011 | Aldunate | |
| 2012/0069023 A1 | 3/2012 | Hur | |
| 2012/0213430 A1 | 8/2012 | Nutter | |
| 2013/0120385 A1 | 5/2013 | Krishnaswamy | |
| 2013/0190602 A1 | 7/2013 | Liao | |
| 2014/0049539 A1 | 2/2014 | Lee | |
| 2014/0078143 A1 | 3/2014 | Lee | |
| 2014/0375641 A1* | 12/2014 | Bakalash | G06T 15/60 345/426 |
| 2014/0375645 A1 | 12/2014 | Bakalash | |
| 2015/0042655 A1 | 2/2015 | Gautron | |
| 2015/0109302 A1 | 4/2015 | Lee | |
| 2015/0172641 A1 | 6/2015 | Nakamura | |
| 2015/0254889 A1 | 9/2015 | Bakalash | |
| 2016/0005209 A1 | 1/2016 | Dachsbacher | |
| 2016/0027204 A1 | 1/2016 | Lee | |
| 2016/0055608 A1 | 2/2016 | Frascati | |
| 2016/0284118 A1 | 9/2016 | Howson | |
| 2016/0292908 A1* | 10/2016 | Obert | G06T 15/08 |
| 2017/0061674 A1 | 3/2017 | Lee | |
| 2017/0103567 A1 | 4/2017 | Peterson | |
| 2017/0109462 A1* | 4/2017 | Palka | G06T 15/06 |
| 2017/0178398 A1 | 6/2017 | Afra | |
| 2017/0236247 A1 | 8/2017 | Akenine-Moller | |
| 2017/0236325 A1* | 8/2017 | Lecocq | G06T 15/55 345/426 |
| 2017/0270146 A1 | 9/2017 | Harrison | |
| 2017/0372508 A1* | 12/2017 | Schoeneman | G06T 7/70 |
| 2019/0057544 A1 | 2/2019 | Lecocq | |
| 2019/0197761 A1 | 6/2019 | Saleh | |
| 2019/0304162 A1 | 10/2019 | Bakalash | |
| 2019/0318528 A1 | 10/2019 | Hunt | |
| 2020/0058155 A1 | 2/2020 | Bakalash | |

OTHER PUBLICATIONS

Hanraman et al., "Ray Tracing on Programmable Graphics Hardware", ACM Siggraph 2001 Proceedings, pp. 703-712.

Parker et al., "OptiX: A general purpose ray tracing engine", Journal ACM Transactions on Graphics—Proceedings of ACM Siggraph 2010, vol. 29, issued on 4 Jul. 2010, Article No. 66.

Wald et al., "Realtime Ray Tracing and its use for Interactive Global Illumination", Proceedings of Eurographics 2003.

Wald et al., "Ray Tracing Animated Scenes using Coherent Grid Traversal", ACM 2006.

Kajiya, J. T., "The rendering equation", In Proc. SIGGRAPH, vol. 20, Nov. 4, 1986.

Beck et al, "CPU-GPU hybrid real time ray tracing framework", vol. 0 (1981) pp. 1-8 (2005).

Bikker, J., "Real-time ray tracing through the eyes of a game developer", In: Proceedings of the 2007 IEEE Symposium on Interactive Ray Tracing, Washington, DC, USA, IEEE Computer Society (2007).

Chen, C.C., Liu, D.S.M., "Use of hardware z-buffered rasterization to accelerate ray tracing", In: Proceedings of the 2007 ACM symposium on Applied computing. SAC '07, New York, NY, USA, ACM (2007) 1046-1050.

Thales Sabino, Paulo Andrade, Esteban Gonzales Clua, Anselmo Montenegro, Paulo Pagliosa, "A Hybrid GPU Rasterized and Ray Traced Rendering Pipeline for Real Time Rendering of Per Pixel Effects", Univ. Federal Fluminense, Rio de Janeiro, Brazil, 2013.

Jon Peddie, "Peddie predicts we could have real time ray tracing on our PCs in less than 6 years", TechWatch, Mar. 27, 2018.

Iman Sadeghi, Bin Chen, and Henrik Wann, "Coherent Path Tracing", Jensen University of California, San Diego, 2009.

Johan Fredriksson et al., "Generating Real Time Reflections by Ray Tracing Approximate Geometry", Gothenburg, Sweden 2016.

Kan, Peter, and Hannes Kaufmann, "Differential irradiance caching for fast high-quality light transport between virtual and real worlds", 2013 IEEE International on Mixed and Augmented Reality (ISMAR), IEEE, 2013.

Parker et al. GPU Ray Tracing, Communications of the ACM, May 2013.

Dave Edwards et al. The Halfway Vector Disk for BRDF Modeling. ACM Transactions on Graphics, NY, USA, 2006. pp. 1-19.

Vaidyanathan et al: "Watertight Ray Traversal with Reduced Precision"; High Performance Graphics (2016); Eurographics Proceedings 2016.

Alwani, Rishi. "Microsoft and Nvidia Tech to Bring Photorealistic Games With Ray Tracing". Gadgets 360. Retrieved Mar. 21, 2018.

Celarek, Adam, "Merging ray tracking and rasterization in mixed reality", Vienna University of Technology (2012).

Broecker, Markus, Bruce H. Thomas, and Ross T. Smith, "Adapting ray tracing to spatial augmented reality", 2013 IEEE International Symposium on Mixed and Augmented Reality (ISMAR), IEEE, 2013.

Kan, Peter, and Hannes Kaufmann, "High-quality reflections, refractions, and caustics in augmented reality and their contribution to visual coherence", 2012 IEEE International Symposium on Mixed and Augmented Reality (ISMAR), IEEE, 2012.

McGuire et al, "Efficient GPU screen-space ray tracing", Journal of Computer Graphics Techniques, vol. 3, No. 4, 2014.

Henrik Wann Jenson, Niels Jorden Christensen, "Photon maps in bidirectional Monte Carlo ray tracing of complex objects", In Computers & Graphics, vol. 19, Issue 2, 1995, pp. 215-224, ISSN 0097-8493.

* cited by examiner

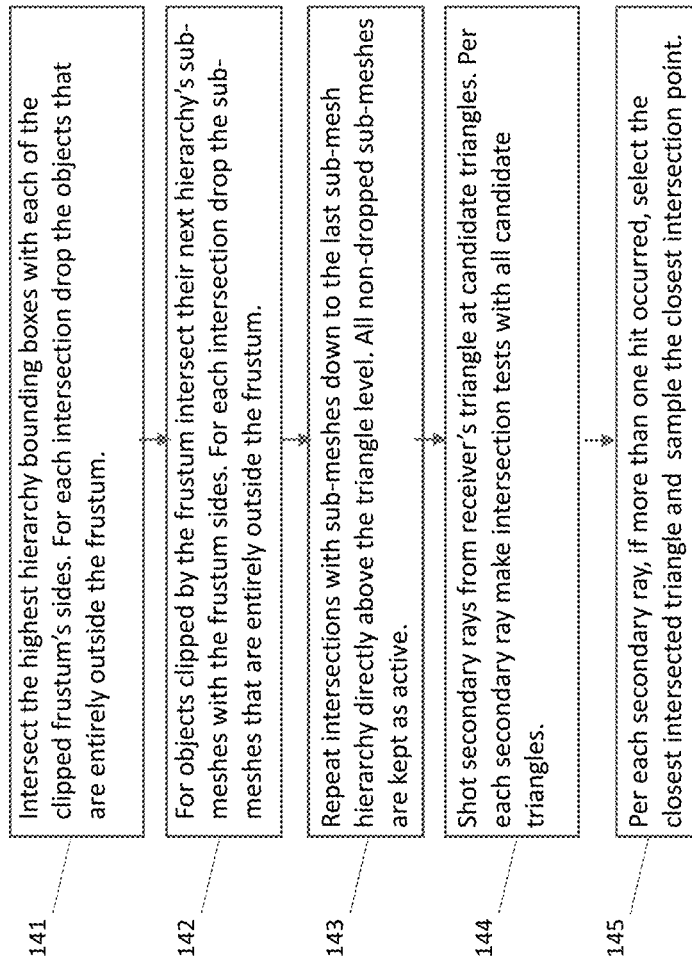

Fig. 14

141 — Intersect the highest hierarchy bounding boxes with each of the clipped frustum's sides. For each intersection drop the objects that are entirely outside the frustum.

142 — For objects clipped by the frustum intersect their next hierarchy's sub-meshes with the frustum sides. For each intersection drop the sub-meshes that are entirely outside the frustum.

143 — Repeat intersections with sub-meshes down to the last sub-mesh hierarchy directly above the triangle level. All non-dropped sub-meshes are kept as active.

144 — Shot secondary rays from receiver's triangle at candidate triangles. Per each secondary ray make intersection tests with all candidate triangles.

145 — Per each secondary ray, if more than one hit occurred, select the closest intersected triangle and sample the closest intersection point.

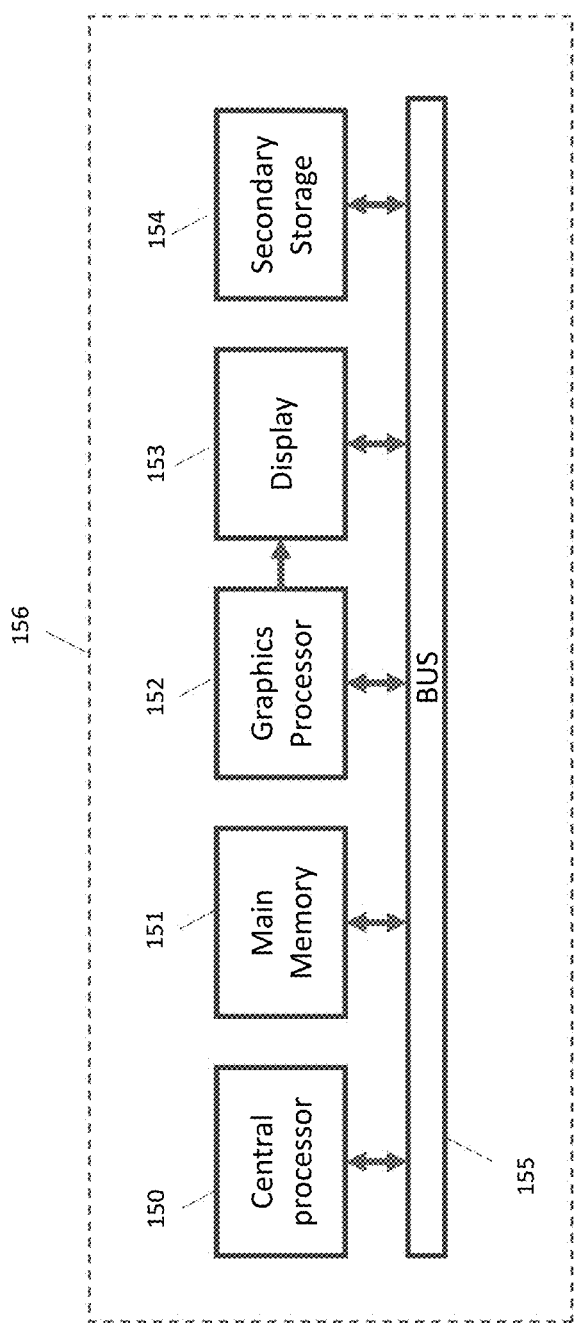
Fig. 15 . Prior art

US 10,991,147 B1

CREATING COHERENT SECONDARY RAYS FOR REFLECTIONS IN HYBRID RAY TRACING

CROSS-REFERENCE TO RELATED CASES

The present application is a continuation application of U.S. application Ser. No. 16/844,681 filed on Apr. 9, 2020, entitled: "Method for Constructing and Traversing Accelerating Structures", which claims priority from U.S. Provisional Application No. 62/957,157 filed on Jan. 4, 2020, entitled: "Ray Traced Look-ahead Navigation in Video Games", which are all incorporated hereby by reference.

The present application refers to the U.S. application Ser. No. 16/662,657 filed Oct. 24, 2019, entitled: "Method for Non-Planar Specular Reflections in Hybrid Ray Tracing", published on Feb. 20, 2020 as Patent Application Publication US 2020/0058155, which teaches a real-time hybrid ray tracing method for non-planar specular reflections. The high complexity of a non-planar surface is reduced to low complexity of multiple small planar surfaces. Advantage is taken of the planar nature of triangles that comprise building blocks of a non-planar surface. All secondary rays bouncing from a given surface triangle toward object triangles keep a close direction to each other. A collective control of secondary rays is enabled by this closeness and by decoupling secondary rays from primary rays. The result is high coherence of secondary rays.

FIELD OF THE DISCLOSURE

The present invention relates to generation of photorealistic real-time reflections from non-planar surfaces in hybrid ray tracing for an advanced visual quality in video gaming, VR, AR, etc.

BACKGROUND

Ray tracing is a computer graphics technology capable of producing a very high degree of visual realism, higher than that of typical raster methods, but at a greater computational cost. Ray tracing is superior to raster graphics by its capability to simulate a wide variety of optical effects, such as glossiness, specularity, radiosity, reflection and refraction, scattering, soft shadows and more. True photorealism occurs when the rendering equation is closely approximated or fully implemented. Implementing the rendering equation gives true photorealism, as the equation describes every physical effect of light flow. However, this depends on the available computing resources. Path tracing, referred to as a Monte Carlo ray tracing is the physically correct ray tracing. It gives an accurate simulation of real-world lighting. Traditional ray tracers [Kajiya, J. T. 1986. *The rendering equation*. In Proc. SIGGRAPH] shoot rays through each pixel, stochastically scattering according to the profile of the intersected object's reflectance and continuing recursively until striking a light source. Repeated sampling for any given pixel in the image space will eventually cause the average of the samples to converge to the correct solution of a rendering equation, making it one of the most physically accurate 3D graphic rendering methods in existence. The prior art ray tracing is one of the most computationally complex applications. As such, it is best suited for applications where the image can be rendered slowly ahead of time, such as in still images and film and television visual effects, and is poorly suited for real-time animated application of augmented reality where the real time animation is critical.

Hybrid ray tracing (ray tracing interlaced with raster rendering) is a deferred rendering process based on raster rendering to calculate the primary ray collision, while the secondary rays use a ray tracing approach to obtain shadow, reflection and refraction effects. This approach vastly improves ray tracing performance, not only because many unnecessary traditional ray tracing tasks are avoided, but also because a complete image is available in a demanded time, even if there is not enough time to finish calculations of all the visual effects. This feature is valuable in video gaming, VR and AR where real time is crucial, therefore the quality may be traded off for performance.

The concept of a hybrid Real-Time Raster and Ray Tracer renderer is not new. Beck et al [Beck et al [Beck, S., c. Bernstein, A., Danch, D., Frohlich, B.: CPU-GPU hybrid real time ray tracing framework (2005)] proposes a CPU-GPU Real-Time Ray-Tracing Framework. Beck proposal spread the traditional stages of ray tracing in independent tasks for the GPU and CPU. These render tasks can be summarized into three GPU render passes: a shadow map generation pass, a geometry identification pass and a blur pass.

Bikker [Bikker, J.: Real-time ray tracing through the eyes of a game developer. In: Proceedings of the 2007 IEEE Symposium on Interactive Ray Tracing, Washington, D.C., USA, IEEE Computer Society (2007)] developed a Real-Time Path Tracer called Brigade, which divides the rendering task seamlessly over both GPU and CPU available cores. Brigade aims the production of proof-of-concept games that use path tracing as the primary rendering algorithm.

Pawel Bak [Bak, P.: Real time ray tracing. Master's thesis, IMM, DTU (2010)] implements a Real-Time Ray Tracer using DirectX 11 and HLSL. Similar to Beck's work, his approach also uses rasterization in order to achieve the best possible performance for primary hits.

Chen [Chen, C. C., Liu, D. S. M.: Use of hardware z-buffered rasterization to accelerate ray tracing. In: Proceedings of the 2007 ACM symposium on Applied computing. SAC'07, New York, N.Y., USA, ACM (2007) 1046-1050] presented a hybrid GPU/CPU ray tracer renderer, where a Zbuffered rasterization is performed to determine the visible triangles at the same time that primary ray intersections are determined. The CPU reads the data back in order to trace secondary rays.

Sabino et al. [Thales Sabino, Paulo Andrade, Esteban Gonzales Clua, Anselmo Montenegro, Paulo Pagliosa, A Hybrid GPU Rasterized and Ray Traced Rendering Pipeline for Real Time Rendering of Per Pixel Effects, Univ. Federal Fluminense, Rio de Janeiro, Brazil, 2013] present a heuristic approach that select a subset of relevant objects to be ray traced, avoiding traversing rays for objects that might not have a significant contribution to the real time experience.

An important strategy in real-time hybrid ray tracing, is the use of GPU for raster techniques to improve the performance and a smart strategy for prioritizing regions and objects that will receive the ray tracing light effects. NVIDIA's OptiX [Parker, S. G., Bigler, J., Dietrich, A., Friedrich, H., Hoberock, J., Luebke, D., McAllister, D., McGuire, M., Morley, K., Robison, A., Stich, M.: Optix: A general purpose ray tracing engine. ACM Transactions on Graphics (August 2010)] is a general-purpose ray tracing engine targeting both NVIDIA's GPUs and general-purpose hardware in the current version. OptiX architecture offers a low-level ray tracing engine, a programmable ray tracing pipeline with a shader language based on CUDA C/C++, a domain-specific compiler and a scene-graph based representation. OptiX is a GPU only solution with remarkably good results for interactive ray tracing. Recently Nvidia OptiX has got a support by Nvidia RTX, which is a development platform for hybrid ray tracing, for a special purpose hardware. It runs on Nvidia Volta- and Turing-based GPUs, specifically utilizing an architecture for ray tracing acceleration.

Despite all the hybrid ray tracing developments, hybrid real-time ray tracers on low-power devices do not exist in prior art. Their applicability on low-power devices, such as laptops, tablets, hand-held mobiles, becomes more and more relevant. The likelihood of running ray tracing on low power devices was forecasted only to the thirties: "By Moore's law alone by 2032 we could be running real time ray tracing on mobile phones." Jon Peddie, TechWatch, 27 Mar. 2018.

Real-time Ray Tracing (RTRT). Historically, ray tracing had been reserved to off-line applications, such as computer-generated photo-realistic animated films. Real-time applications of video games, virtual and augmented reality had have to rely on rasterization for their rendering. RTRT is a hard-computational task, not only because each pixel in the image must be calculated separately, but also because the final color of a single pixel can be affected by more than one recursive ray. Another consideration is that ray tracing algorithms waste from 75% to 95% of its execution time calculating intersection points between rays and objects. RTRT has been enabled by Nvidia's RTX in 2018 (Alwani, Rishi. "Microsoft and Nvidia Tech to Bring Photorealistic Games with Ray Tracing". Gadgets 360 https://gadgets.ndtv.com/laptops/news/microsoft-dxr-nvidia-rtx-ray-tracing-volta-pu-metro-exodus-132698. Retrieved Mar. 21, 2018), facilitating a new development in computer graphics of generating interactive images that react to lighting, shadows, reflections by special purpose hardware. Nvidia's RTX is based on traditional ray tracing algorithm accelerated by an on-chip supercomputing hardware of closely 5000 cores. It comprises of a GPU having 4352 cores, AI denoiser utilizing 544 cores, and intersection tests accelerator of 68 cores. The power requirement of a single RTX2080 GPU is 250 W, and the price starts at €418. Due to the high cost and high power of RTX it is targeted at the high-end video games.

For video games, virtual reality and augmented reality, there is a great need to enable features that can be delivered only by the ray tracing technology, such as reflections, specifically reflections from non-planar surfaces that can't be achieved by the raster technology or by work-arounds. Reflection must be generated in real-time. Therefore, for the game industry there is a great need for a new hybrid real-time ray tracing technology, based on radical algorithmic improvements.

Reflections. In prior art's hybrid ray tracing the reflections are generated based on G-buffer (Luis Sabino et al., A Hybrid GPU Rasterized and Ray Traced Rendering Pipeline for Real Time Rendering of Per Pixel Effects, 2013). The G-Buffer is generated during the first stage by raster rendering, a "differed shading" stage. The basic idea behind deferred shading is to perform all visibility tests before performing any lighting computations. Therefore, at first, visibility tests are done by raster rendering, while shading is differed to a later stage, combined with ray tracing. The G-buffer produced by the deferred shading stage contains information about optical properties of the underlying material of each pixel. Its contents are used to determine the need for tracing reflection/refraction rays. It is composed by reflectivity, index of refraction, specular exponent and opacity, respectively. The rays need to be traced from the surfaces only through the scene. This way enables to avoid trace of unnecessary rays in places where the material is neither refractive nor reflective. After differed shading is done, the ray tracing algorithm starts with secondary rays and can follow its own path. Any secondary ray generated will be traced against scene in order to produce global illumination effects, such as reflections and refractions. The result of this stage can be understood as the generation of a ray trace effects layer. This effects layer will be blended to the image already generated, in order to improve its visual quality with global illumination effects.

According to the G-buffer method the secondary rays are a natural extension of primary rays. Ray tracing that is carried-on by the chosen secondary rays suffer from the same difficulties of conventional ray tracing: lack of coherence of secondary rays and images with stochastic noise.

Generating fast reflections was described by Reuven Bakalash in U.S. Pat. No. 10,565,776: Method for Fast Generation of Path Traced Reflections on a Semi-Reflecting Surface. His disclosure describes a new global illumination ray tracing, applied to augmented reality and virtual reality. The Acceleration Structures of prior art are replaced by a new and novel device for carrying out the intersection between secondary rays and scene geometry in large groups of rays, gaining high speed and lowering computational complexity. Its reduced power consumption is suitable to consumer level computing devices.

Accelerating structures. The most time-consuming tasks in ray tracing are intersection tests between millions of rays and millions of polygons. They are partly relieved by use of acceleration structures (AS) which are huge binary trees, specifically structured for the scene space. Every single ray is traversed across an accelerating structure (e.g. K-trees or BVH trees), seeking polygons for intersection. These traversals become a major time-consuming task—they typically take over 70% of the image generation time.

The prior art AS based on binary trees (e.g. BVH) are basically static. Their reconstruction is typically more time consuming than rendering. The construction time depends on the scene size and polygon resolution. E.g. building an acceleration data structure of highly complex geometry is prohibitively expensive or imposed restrictions on how the geometry had to be modelled. Hanika et al. addresses this difficulty in U.S. Pat. No. 8,570,322, Method, system, and computer program product for efficient ray tracing of micropolygon geometry. They teach a first hierarchy of surface patches which is ray traced to identify which are potentially intersected. Then the potentially intersected patches are decomposed, on-demand, into a set of subobjects of micropolygons and a second hierarchy is established in order to accelerate ray tracing. Shaders that operate on this second hierarchy of micropolygons can process an entire grid of them at once in SIMD fashion.

Small scene changes may need only an update of AS, however, a major modification of the scene necessitates a reconstruction of the acceleration structures. Big scenes are posing a particular difficulty due to very long reconstruction times. Reuven Bakalash et al. addresses this problem in U.S. Pat. No. 10,380,785 titled: Path Tracing Method Employing Distributed Acceleration Structures, by distributing the acceleration structure. The traversal task in a path tracing system is distributed between one global acceleration structure, which is central in the system, and multiple local acceleration structures, distributed among cells, of high locality and of an autonomous processing. Subsequently, the centrality of this critical resource is reduced, lessening bottlenecks, while its parallelism is improved.

There are two major drawbacks associated with the use of static acceleration structures; (i) traversals of these structures are time-consuming, challenging the real-time requirements, and (ii) they must be repeatedly reconstructed upon scene changes, which contradicts with real time skinned animation. Reconstructing static acceleration structure is a computationally intensive task preventing real-time animation.

There is thus a need for addressing these and/or other issues associated with the acceleration structures of prior art.

Lack of ray coherence of secondary rays. Coherence of rays is the key for efficient parallelization of ray tracing. In prior art ray tracing the primary and shadow rays are coherent. This coherence is exploited for efficient parallel processing: traversing, intersecting, and shading by packets of coherent rays. They work well for nearby primary rays, since these rays often traverse similar parts of the accelerating data structure. Using this approach, we can reduce the compute time by using the conventional SIMD mechanisms of GPUs and CPUs for multiple rays in parallel, reducing memory bandwidth by requesting data only once per packet, and increasing cache utilization at the same time. This works fine for primary rays that originate from the camera. Unfortunately, it is not possible to use ray packets effectively with rays of an advanced order (secondary, ternary, etc.). The primary reason is the advanced order rays bounce in different direction losing coherence. Moreover, there is an intentional randomization of rays for diffuse reflections. Reorganizing secondary rays to form bundles with higher coherence ratios, are practiced by the prior art. But this kind of regrouping is a quite expensive operation since it involves a scatter/gather step, which may result in only a slight frame rate improvement when reordering is applied.

Sadegi et al. [Iman Sadeghi, Bin Chen, and Henrik Wann, Coherent Path Tracing, Jensen University of California, San Diego, 2009], developed a technique for improving the coherency of secondary rays. This technique uses the same sequence of random numbers for generating secondary rays for all the pixels in each sample. This improves the efficiency of the packet tracing algorithm but creates structured noise patterns in the image.

Improving coherency in ray tracing is addressed by Reuven Bakalash et al. in U.S. Pat. No. 10,410,401 titled: Spawning Secondary Rays in Ray Tracing from Non-Primary Rays. He describes a novel way of generating coherent secondary rays for a global illumination ray tracing. The Acceleration Structures of prior art are replaced by a new and novel device of carrying out the intersection between secondary rays and scene geometry in large groups of rays, gaining high speed and lowering computational complexity.

There is thus a need for addressing these and/or other issues associated with lack of coherency in ray tracing of prior art.

Noisy images. A path tracer continuously samples pixels of the screen space. The image starts to become recognizable after only a multiple samples per pixel. Rays are distributed randomly within each pixel in screen space and at each intersection with an object in the scene a new reflection ray, pointing in a random direction, is generated. After some number of bounces, each ray eventually exits the scene or is absorbed. When a ray has finished bouncing about in the scene a sample value is calculated based on the objects the ray bounced against. The sample value is added to the average for the source pixel.

The random components in ray tracing cause the rendered image to appear noisy. The noise decreases over time as more and more samples are calculated. The defining factor for render quality is the number of samples per pixel (SPP). The higher SPP you have in a rendered image the less noise will be noticeable. However, the added quality per sample decreases the more samples you have already (since each sample is just contributing to an average over all samples).

Only converge of many subsequent frames reduces the final image noise. The image to converge and reduce noise to acceptable levels usually takes around 5000 samples for most path traced images, and many more for pathological cases. Noise is particularly a problem for animations, giving them a normally unwanted "film-grain" quality of random speckling.

An object of at least one of the embodiments of the disclosure is to enable a use of real-time photorealistic reflections in video games, VR and AR, and to solve a lack of relevant technology in the related art.

SUMMARY

The embodiments of the disclosure generate photorealistic reflections in non-planar reflective surfaces in hybrid ray tracing. In order to accommodate real-time skinned animation a genuine dynamic acceleration structure (DAS) is employed. It is characterized by high locality, wherein scene changes are updated locally in one of its hierarchies, without effecting other locations in the structure. Each scene object in DAS can move independently of other objects, allowing autonomous updates at its own hierarchy, without effecting its neighboring hierarchies. Therefore, fast reconstructions of entire accelerating structures of prior art is replaced by low-cost updates.

The efficiency of DAS traversals is improved by a double step traversal; first with a geometric volume, e.g. triangular pyramid to eliminate negative intersection tests, and then with secondary rays for efficient and accurate intersection tests of the leaf hierarchy.

Coherence of secondary rays, a long-felt need in ray tracing, is achieved by handling secondary rays with collective origin and collective destination. Such a coherence attains high parallelism and high utilization of GPU.

BRIEF DESCRIPTION OF THE DRAWINGS

The disclosure is herein described, by way of non-limiting examples only, with reference to the accompanying figures and drawings, wherein like designations denote like elements.

Understanding that these drawings only provide information concerning typical embodiments of the disclosure and are not therefore to be considered limiting in scope:

FIG. 14. Flow chart of another embodiment.

FIG. 15. Prior art. Computing system in accordance with the embodiments.

DETAILED DESCRIPTION OF THE DISCLOSURE

An object of at least one of the embodiments of the disclosure is to enable a use of photorealistic reflections in video games by solving the lack of relevant technology in the related art. Real time reflections, from planar and non-planar, reflective and glossy surfaces are enabled through a real-time hybrid ray tracing technology.

Figure 1:
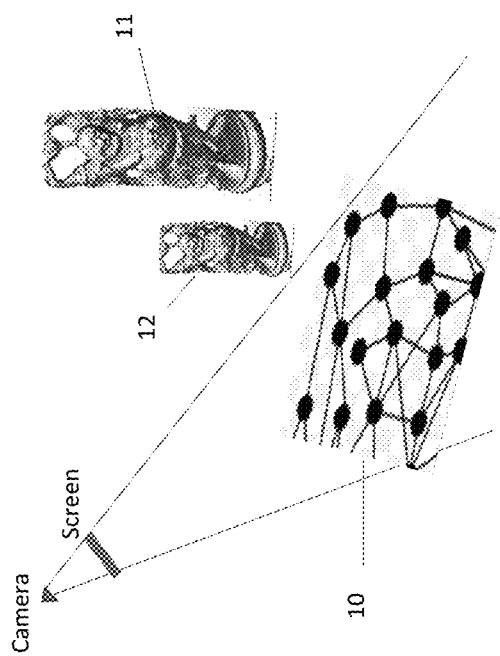
FIG. 1. An exemplary setup of a non-planar reflective surface and geometric objects.

Mirror reflections from non-planar surfaces. A non-planar surface, unlike a planar one, is lacking a uniform direction. It is constructed of triangles which are planar elements. Each triangle reflects the scene according to its normal direction. The method of disclosure is meant to generate a physically correct reflection of objects in a non-planar surface. An exemplary setup is shown in FIG. 1. Two target objects 11, 12 would reflect in a non-planar surface 10 consisting of multiple receiver triangles.

According to one embodiment each receiver's triangle is handled separately to generate its own physically correct reflection. A final gathering of the partial reflections results in an aggregate non-planar surface reflection.

Figure 2:
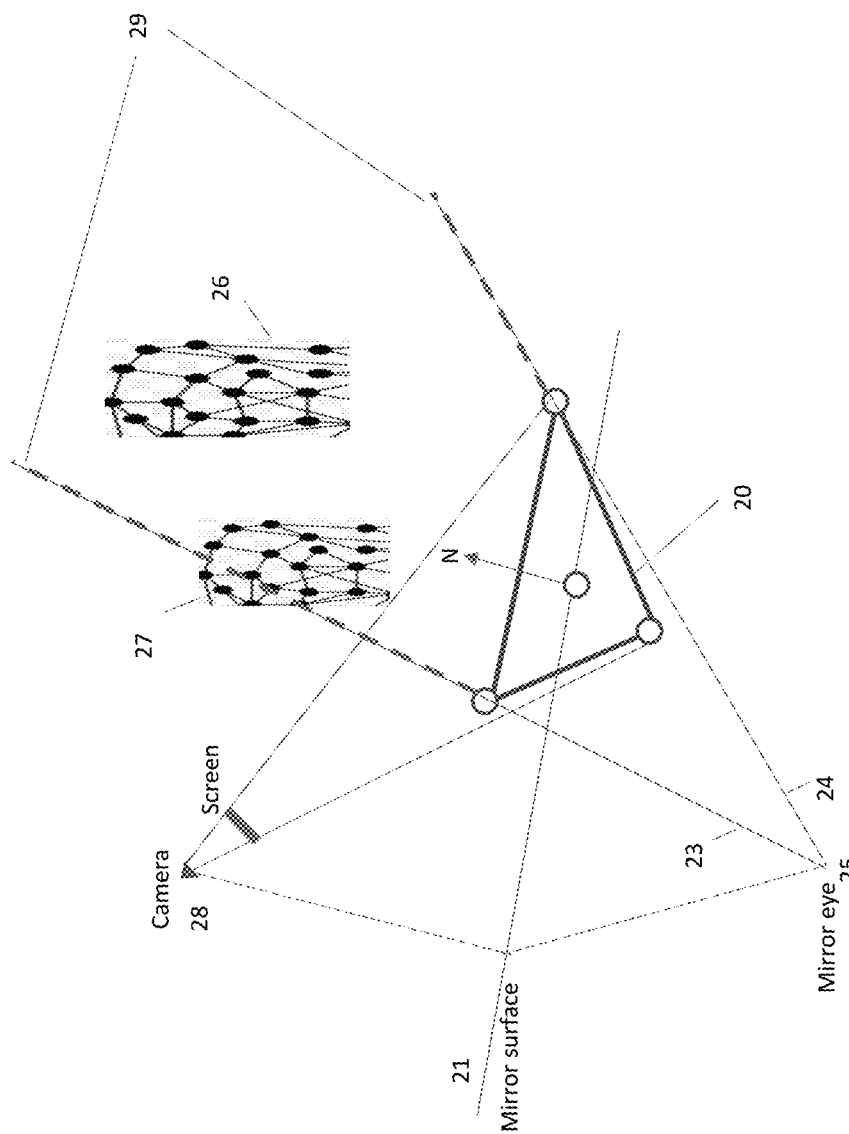
FIG. 2. A triangle of a non-planar reflective surface related to geometric objects.

FIG. 2 shows 20 one of the surface's triangles. The two target objects 26, 27 consist of meshes of emitting triangles. In order to calculate a correct reflection in the receiving triangles, a normal of each such triangle must be calculated. Then secondary rays are shot from according to the normal direction from each receiver triangle toward emitting triangles of the objects.

A receiver triangle's normal is evaluated based on the normals of its three vertices. Each such vertex is shared with neighboring triangles. Therefore, due to non-planarity, each vertex has its own normal direction. A triangle's normal direction N is calculated by averaging the normal directions of its three vertices.

Once the triangle's normal is known, a mirror surface 21 through the mid-point of the triangle is obtained, and then the mirror eye 25, which is the camera 28 reflection in the mirror surface, is defined. The mirror eye serves as an origin of a frustum projection. The frustum is shaped by the receiver's triangle 20 and directed toward the target objects 26 and 27. The frustum defines the scene visibility from the triangle. In the example of FIG. 2 the object 26 is entirely visible, while object 27 is only partly visible. Thus, portion of the triangle mesh of 27 remains outside the frustum.

Figure 3:
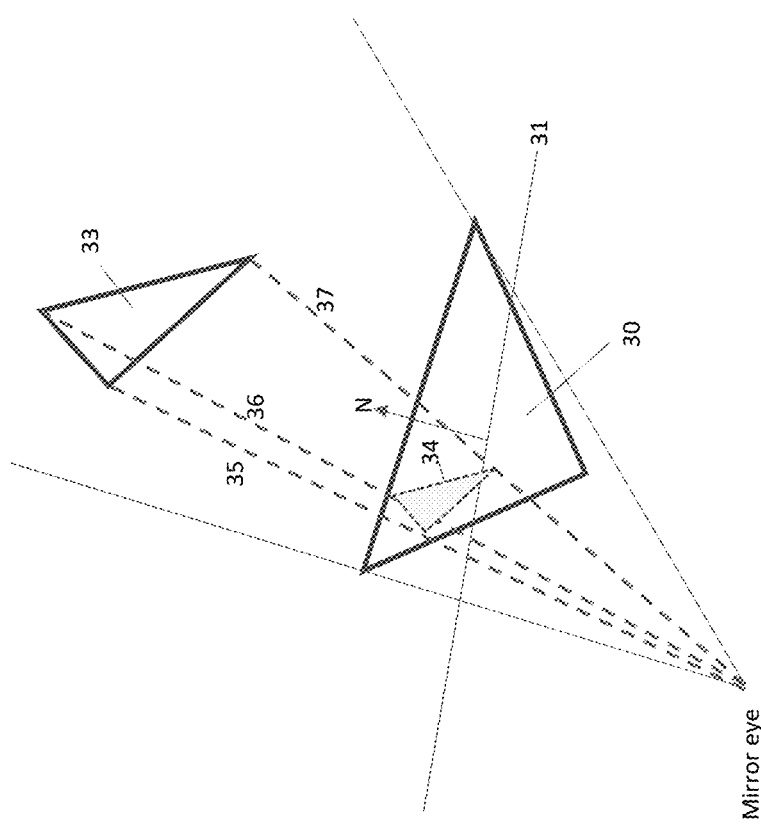
FIG. 3. Object's triangle projected onto triangle of a non-planar reflective surface.

An analytical embodiment of generating reflection is illustrated in FIG. 3. A receiving triangle 30, an emitting triangle 33, and the final emitter's reflection 34 in the receiver, are shown. The task of reflecting an emitting triangle onto receiving triangle applies only to the visible triangles of the object mesh. The frustum visibility test identifies the emitting candidates for reflection. The detailed visibility test is described hereinafter.

Once the emitter triangle 33 passed the visibility test, it is handled for reflection. It is sampled for color, light, material, texture, etc., and projected onto receiver's surface by its three vertices 35, 36, 37. Emitter triangles that fall partly outside the receiver, are clipped to receiver's boundaries. Then the projection is shaded according to the sampled light values. Then these secondary light values are merged with their respective primary hit points on the receiver triangle, to reconstruct the final reflected light. Finally, the results are delivered, together with other receiver triangles, to the image pixels on the screen.

Figure 4:
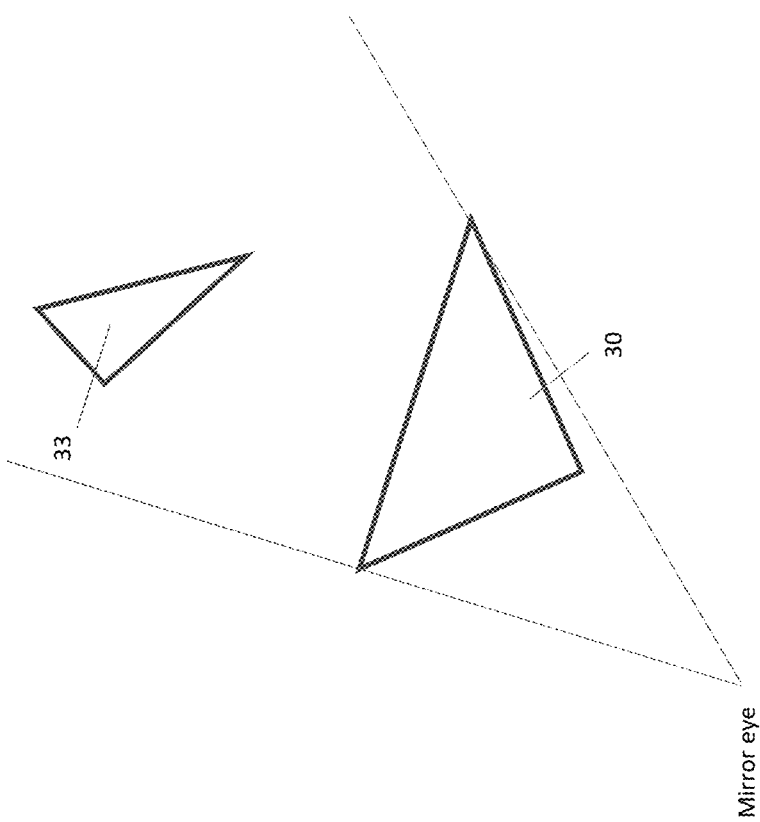
FIG. 4. Object's triangle related to triangle of a non-planar reflective surface. No projection.

Another embodiment utilizing secondary rays, FIG. 4, reflects the emitting triangle in the receiving one by full use of secondary rays. A receiving triangle 30, and an emitting triangle 33 are shown. The reflection task applies only to those triangles of the target object mesh that passed the visibility test and have been identified as candidates for reflection.

As shown back in FIG. 2, secondary rays cover the frustum area from the receiver 20 and up along the dashed lines 29. Secondary rays are meant to make an accurate examination of the visible mesh, triangle by triangle. Each secondary ray performs intersection tests with emitter triangles, and the intersected triangles are sampled for color, light, material, texture, etc. The sampled data is merged with the respective primary hit points to merge the sampled light values of the primary and secondary rays, for full reconstruction of the reflection. Finally, the results are delivered, together with other receiver triangles, to the image pixels on the screen.

Dynamic acceleration structure. Acceleration structures (AS) in ray tracing require fast construction and fast traversals. Unfortunately, these two requirements contradict each other. BVH accelerating structures are the most widespread in prior ray tracing. The more hierarchical levels the faster is the traversal, but the construction becomes more time expensive. Fast construction and fast traversals are imperative for real-time ray tracing, and specifically for real-time skinned animation.

In order to accommodate real-time skinned animation, the disclosure employs a genuine dynamic acceleration structure (DAS) with high locality, in which the changes in the scene, such as skinned animation of an object, are updated locally, in a specific location within the DAS hierarchy, without effecting other locations in. The DAS is constructed only once, and then only the required per-frame updates are done. Thus, the need for fast construction is replaced by the low-cost updates.

The DAS is established of a separate hierarchy per each scene-object such that each subsequent hierarchy level comprises sub-meshes of the preceding level, wherein all the sub-meshes are bounded by bounding boxes. At the bottom of each hierarchy is a leaf level of triangles.

For fast traversals, an embodiment is based on an early visibility test that eliminates redundant intersection tests, and only then secondary-ray intersection tests. In the first phase a visibility test of target objects is done by traversing the mesh and sub-mesh hierarchies with a geometric volume, e.g. pyramidoid. Non-visible objects or part thereof are dropped off, saving redundant intersection tests. During the second phase only the leaf hierarchy of triangles is traversed with secondary rays. In bottom line, the amount of intersection tests is reduced.

Figure 5:
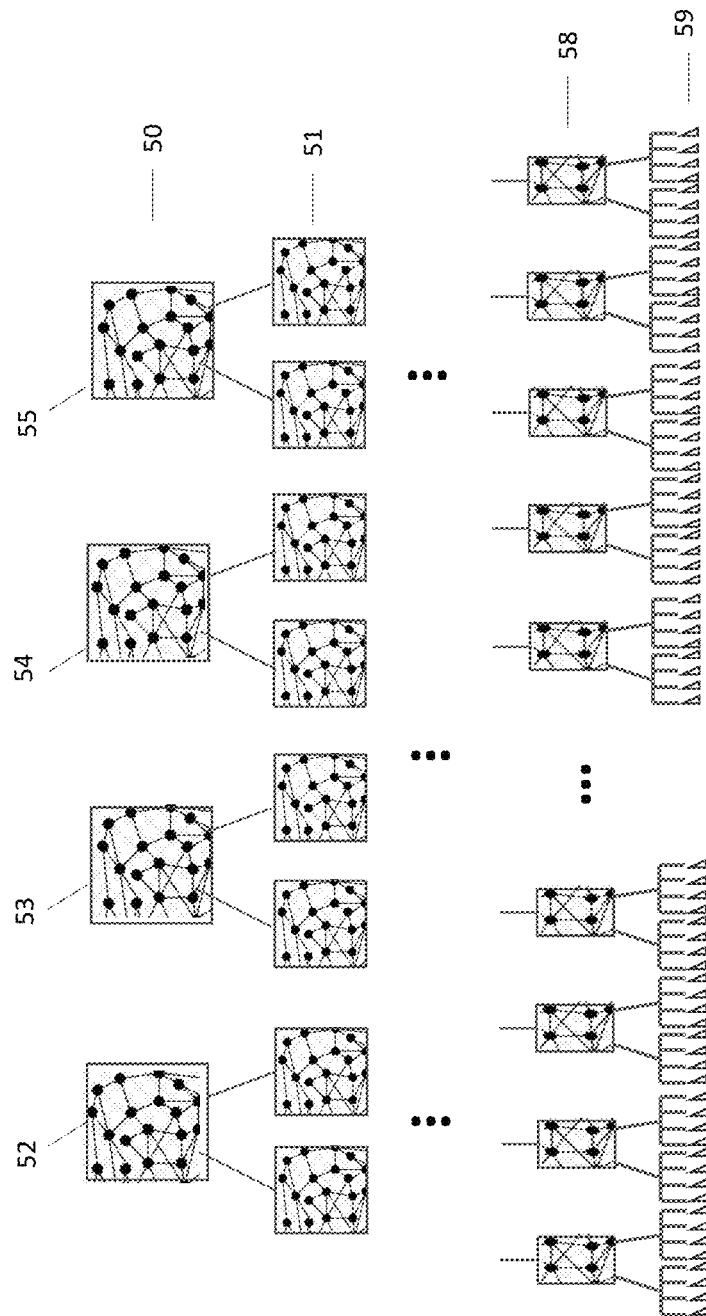
FIG. 5. Dynamic accelerating structure of four geometric objects.

An example of a DAS structure is shown in FIG. 5. The DAS is hierarchically structured, wherein in the first, the highest hierarchy 50, it contains bounding boxes of geometric objects. The example comprises meshes of four target objects 52-55. The next hierarchy is formed of sub-meshes 51. The same way an arbitrary number of additional hierarchies can be formed, wherein each successive hierarchy comprises sub-meshes of the previous hierarchy. The leaf hierarchy 59 is formed of triangles. The DAS may be built in a preprocessing operation prior starting rendering frames, or in run time.

The DAS is structured differently from bounding volume hierarchy (BVH) of prior art. Its top hierarchy starts directly with the geometric objects, no single bounding volume at the top of the tree. Each geometric object is independent of other objects, allowing autonomous updates at its own hierarchy, without effecting its neighboring objects.

In the animation art a skinned animation is typically represented in two parts: a surface representation used to draw the character (called skin or mesh) and a hierarchical set of interconnected bones (called the skeleton or rig) used to animate the mesh. The intention is to control the first part only, graphics deformation of the mesh data. When such deformation of an object occurs, its surface representation is accordingly updated within its main mesh, sub-meshes and their bounding boxes, keeping locality and autonomy, without effecting the neighbor objects or the hierarchy of the overall structure. Such autonomy of each geometric object makes the DAS dynamic allowing efficient and fast update of dynamic scenes.

Figure 7:
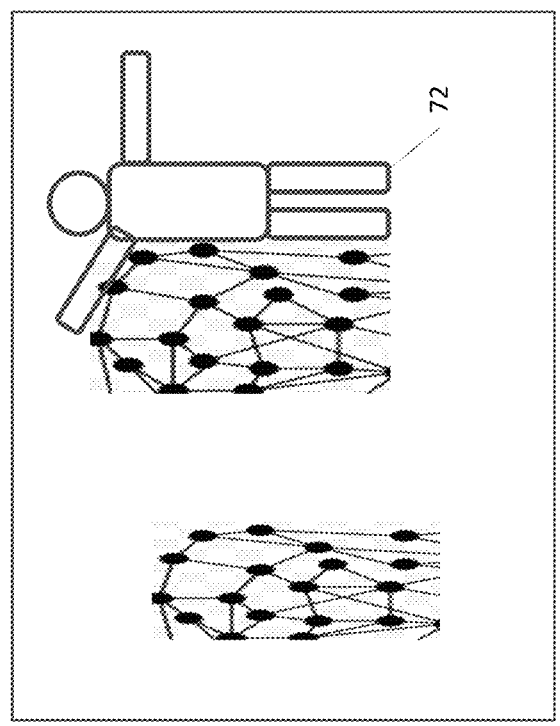
FIG. 7. Skin-animated scene.
Figure 6:
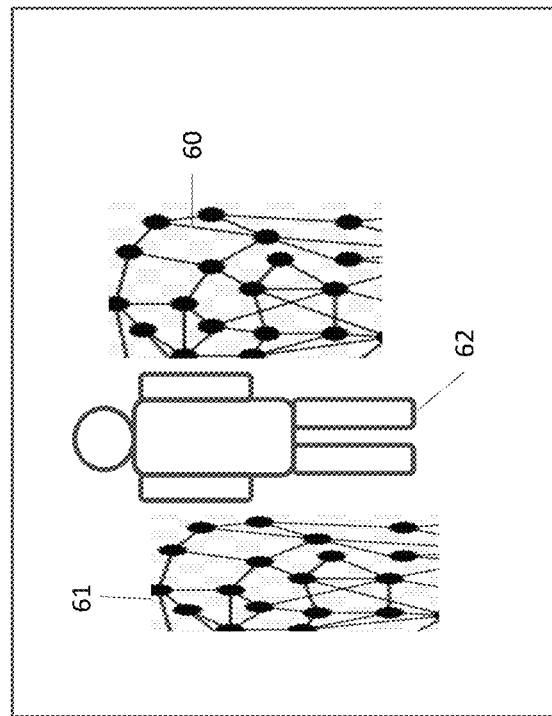
FIG. 6. Pre-animated scene.
Figure 8:
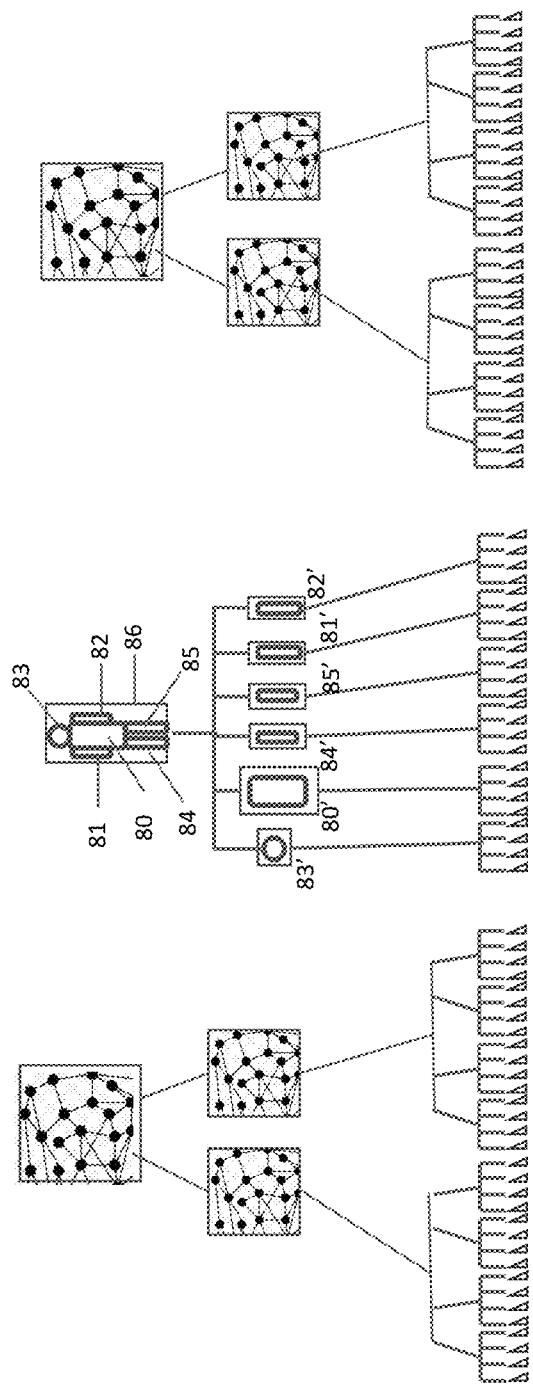
FIG. 8. DAS of the pre-animated scene.

The principle of locality of the skinned animated updates in the dynamic acceleration structure is demonstrated in FIGS. 6-9. In FIG. 6 three objects are shown 60, 61, and 62. The mid object 62, is a human figurine at its original position. Then it is shown skinned animated in FIG. 7, when transferred and transformed. The figurine 72 moved to another place and raised its hands. FIG. 8, referring to FIG. 6, shows the original pre-animated DAS. The figurine is represented by the mid column. Its top hierarchy comprises bounding box 86 of all its parts 80-85. The second hierarchy contains bounded sub-meshes 80'-85' of the parts, while the bottom hierarchy comprises the triangles. The two other columns represent the hierarchies of two other objects, which remain static.

Frustum intersection test. Intersection tests between millions of rays and millions of polygons is the most time-consuming task in ray tracing. In prior art every single ray must traverse across hierarchies of an accelerating structure seeking for intersections. The efficiency is reduced by making intersection tests that end up with negative results. According to an embodiment the efficiency is improved by eliminating most of the negative tests. A preliminary visibility test is introduced for culling invisible meshes. The visibility test is done by traversing the mesh hierarchies of the accelerating structure with a triangular pyramid that bounds the frustum. Parts that fall out of the frustum pyramid are sorted-out because of the non-relevant intersection tests.

Figure 9:
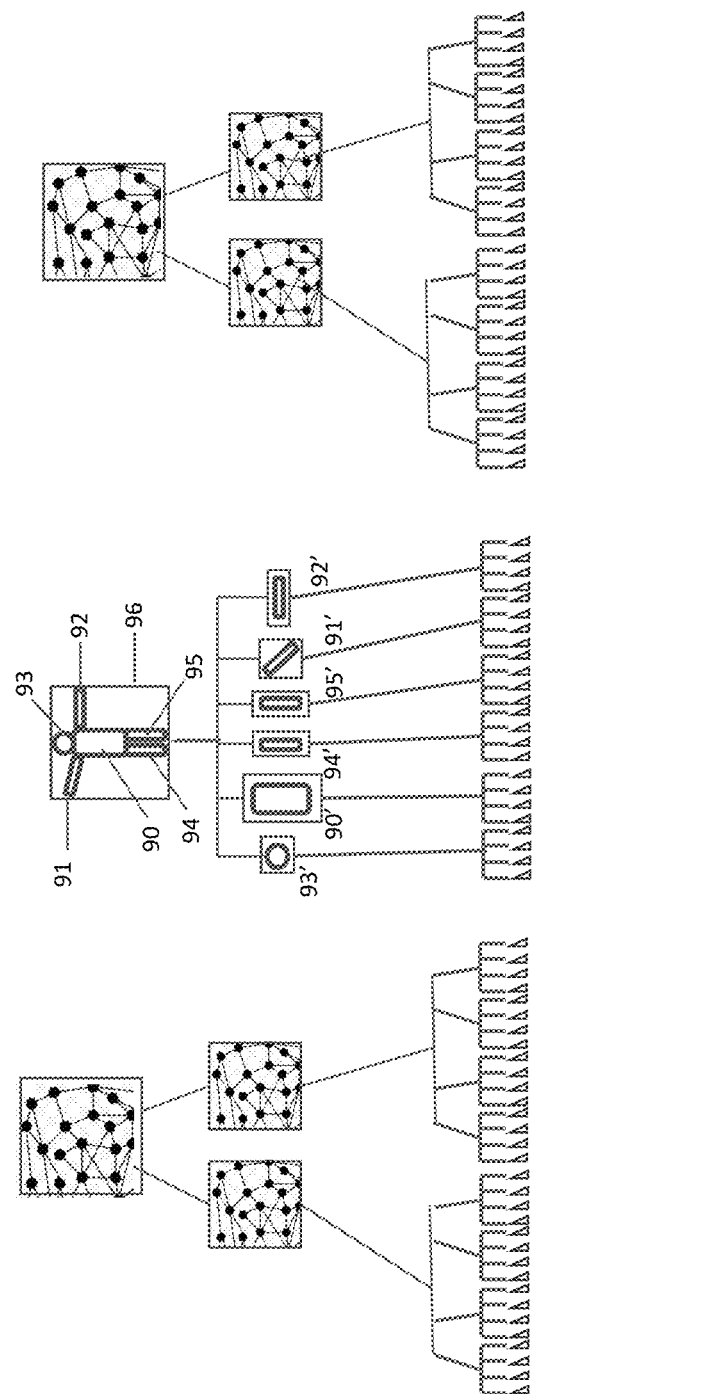
FIG. 9. DAS of the skin-animated scene.

FIG. 9, referring to FIG. 7, demonstrates the post animated DAS. The bounding box 96 was updated following the displacement of sub-parts 91, 92. In the second hierarchy the sub-meshes 91' and 92' and their bounding boxes undergo an update. All the updates went local, without effecting other sub-meshes of the same object or other objects hierarchies. This locality of updates makes the DAS a dynamic data structure, enabling real-time skinned animation. Such real-time animation is critical for delivering high visual quality to video games, virtual reality and augmented reality.

According to an embodiment the efficiency of intersection tests is improved by introducing a preliminary visibility test to eliminate invisible parts of objects, which have no chance of positive intersection tests. As shown, the frustum of FIG. 10 has a shape of a triangular pyramid consisting of three sides 104, 105 and 106, cut by their near end 103 (the receiver triangle) and their far end 100. The frustum vertices are guided by the receiver triangle's normals 107, 108, 109. As mentioned before, the receiver triangle's normals may be different from each other, where each vertex shares its normal with neighbouring receiver triangles of the non-planar surface. The frustum has a shape of a triangular pyramid based on the receiver triangle. A receiving triangle 103 and three emitting objects 100, 101 and 102 are shown in this exemplary setup. The object 101 is fully visible, therefore eligible to all intersection tests. The second object 102 falls partly outside the frustum, its sub-meshes that fall entirely outside would be eliminated. The third object 110 that falls outside the frustum, would not be tested for intersections.

Figure 11:
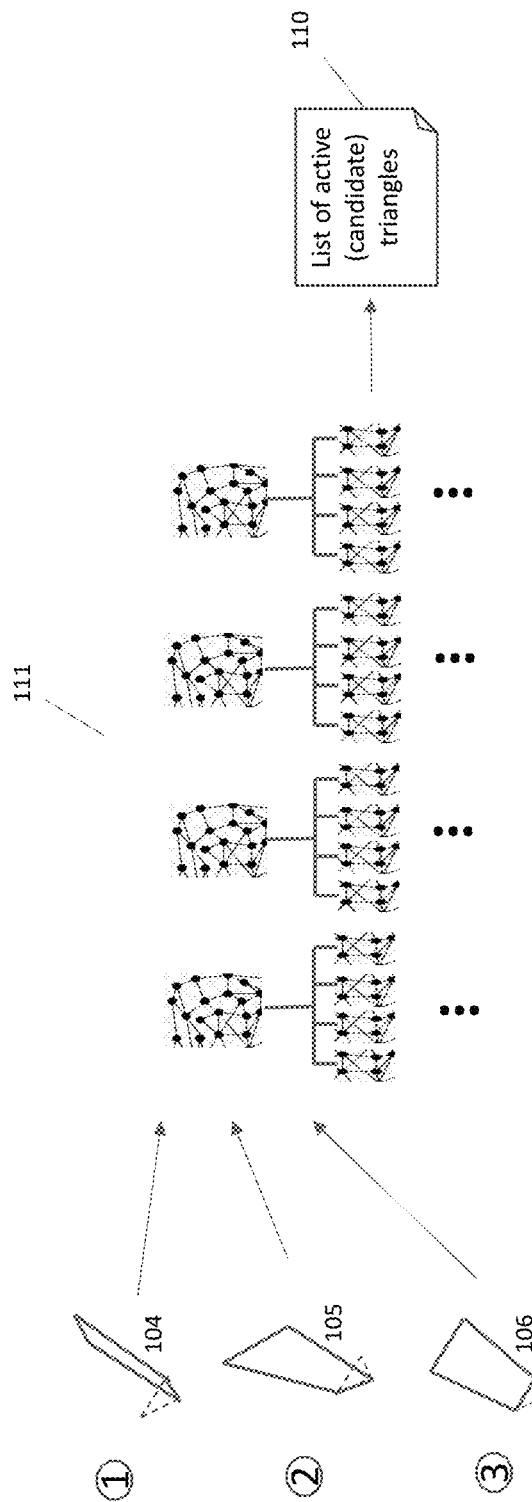
FIG. 11. Step of visualization traversal.

FIG. 11 illustrates the process of sorting out objects and their sub-meshes in DAS (111) that are laying entirely outside the frustum. Polygons 104, 105, 106 represent the three frustum's sides. Each of these walls is used in a row to traverse the mesh and sub-mesh hierarchy levels of the DAS bounding boxes, to cut out the out-of-frustum objects and parts thereof. This traversal occurs only with the mesh levels of the DAS, from the upper level down to the last sub-mesh level, right above the triangle level. An output of the first wall's traversal 104 is used as an input to the next wall's traversal 105, and then to wall's traversal 106. Each traversal sorts out bounding boxes of object meshes or of sub-meshes that fall entirely on the opposite side of the frustum. During the frustum-test the triangle level 59 (FIG. 5) stays out of traversal. The result of the frustum-test is a list of relevant sub-meshes 110 of the last mesh hierarchy above the triangle level, as candidates for intersection tests.

According to one embodiment, for accuracy and efficiency, only the last hierarchy level is traversed with secondary rays. That level of triangles is traversed separately. Once the frustum traversal step has been finalized, a subsequent traversal step takes place. It is based on tracing secondary rays from the receiver triangle toward the emitting objects. In this traversal step, only the sub-meshes that survived the visibility test remain active. Their triangles are tested by secondary rays for intersection.

Figure 12:
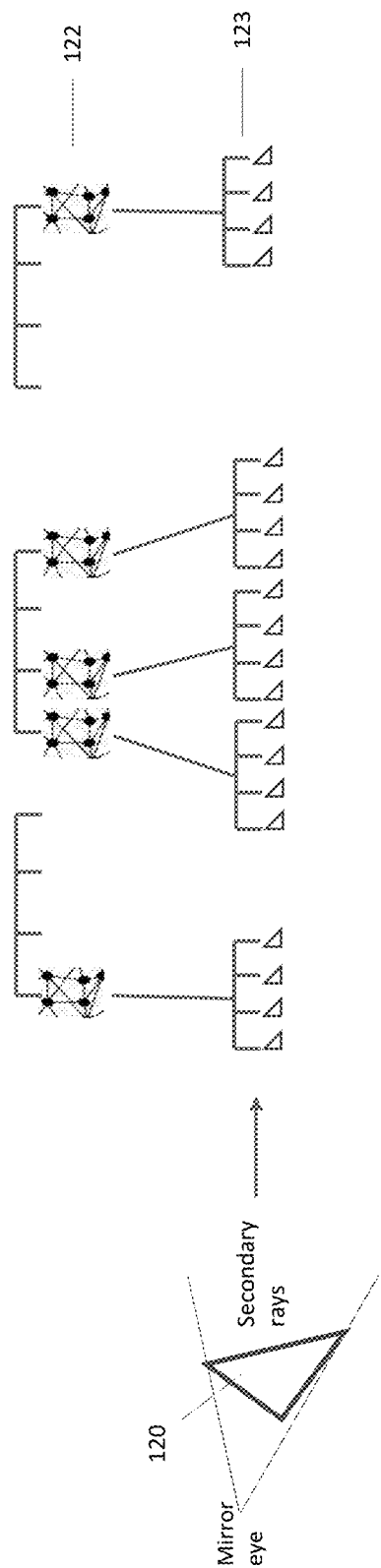
FIG. 12. Step of a secondary ray traversal.

This second step is shown in FIG. 12. The DAS structure 121 is sparse, comprising only the candidate meshes, sub-meshes and triangles that survived the visualization test. Only the lowest sub-mesh hierarchy, directly above the triangle level, is shown 122. The candidate triangles 123, shown in the bottom level of DAS, are the candidates for intersection tests. According to the analytical embodiment a single intersection test for each emitting triangle suffices for choosing a triangle. No additional intersection tests for the triangle are needed. The emitter triangle is taken for an analytical projection on the receiving triangle and for shading. Each secondary ray of a receiving triangle would traverse through the candidate emitting triangles. The first time an emitting triangle is found hit by a ray, the triangle is removed from the list of candidate triangles and is projected on the receiving triangle. The list is shrinking throughout the intersection tests speeding up the intersection process.

Figure 13:
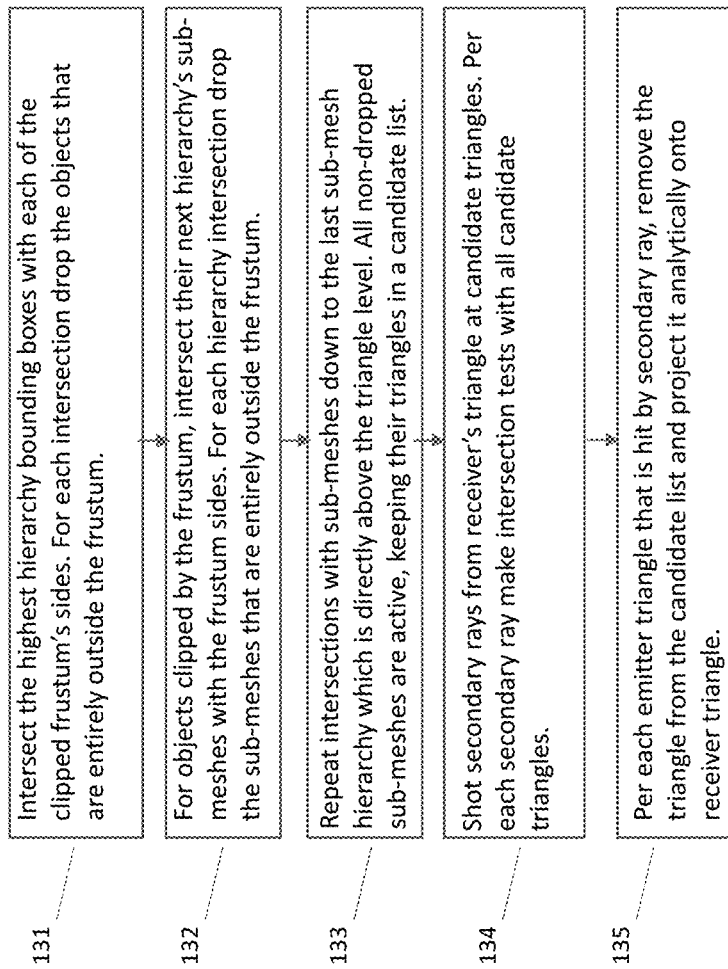
FIG. 13. Flow chart of analytical embodiment.

The embodiment of analytical intersection tests is shown in the flow chart of FIG. 13. In stage one the geometric objects or part thereof, are clipped out by the frustum test, eliminating intersection tests that would occur outside the frustum. Stage two, the remaining emitting triangles undergo an intersection test by secondary rays, and if intersected once, then an analytical projection of that emitting triangle on the receiving triangle is done, saving subsequent intersection tests.

First 131 the highest hierarchy bounding boxes of the DAS structure (111 of FIG. 11) are intersected with each of the three clipped frustum's sides 104-106. At each intersection the geometric objects that are entirely outside the frustum are dropped from candidacy. For objects remaining at least partly inside the frustum their sub-meshes of next hierarchy are taken for intersection with the frustum sides.

Again, for each intersection these sub-meshes that are entirely outside the frustum are dropped 132. The frustum intersection test is descending along the sub-mesh hierarchy 133, wherein the last intersection is done directly above the triangle level. Only the triangles that belong to the sub-meshes that passed at least partly the visibility test are kept in the list of active sub-meshes 110. The second stage starts at the block 134. Secondary rays are shot from the receiver's triangle at active triangles. Each secondary ray makes intersection tests with all candidate triangles. Per each triangle that is hit by a secondary ray, remove the triangle from the candidate list and project it analytically onto receiver triangle. Then 135, once a secondary ray hits a triangle, the triangle is sampled for material, color, light, etc., and an analytical projection of the triangle onto the receiver's triangle is done (see FIG. 3). No additional intersection tests between secondary rays and the intersected triangle are done. The redundant intersection tests are saved, improving efficiency.

According to another embodiment, all secondary rays of a receiving triangle would travers through all the candidate triangles 110, seeking for intersection. The length of the candidate list remains stable. The intersected triangles are sampled for light values at the point of intersection. This embodiment is flowcharted in FIG. 14. The first stage of eliminating objects or part thereof that reside out of the frustum is identical to the analytical embodiment 141-143. In stage two, the remaining emitting triangles undergo an intersection test with all relevant secondary rays.

First 141 the highest hierarchy bounding boxes of the DAS structure (111 of FIG. 11) are intersected with each of the three clipped frustum's sides 104-106. At each intersection, geometric objects that are not visible, entirely outside the frustum are dropped. For objects remaining at least partly inside the frustum their sub-meshes of next hierarchy are taken for intersection with the frustum sides. Again, for each intersection the sub-meshes that are entirely outside the frustum are dropped 102. The frustum intersection test is done down the sub-mesh hierarchy 143, wherein the last intersection is done at the hierarchy level directly above the triangle level. Only the triangles that belong to the sub-meshes that passed at least partly the inside-frustum test are kept in the candidacy list 110. The second stage starts at block 144. Secondary rays are shot at active triangles 123 from receiver's triangle. Each secondary ray makes intersection tests with all active triangles. Once secondary ray hits a triangle, it brings a sample of material, color, light, etc. from its closest hit (multiple intersections may occur for a single ray) to the receiver's triangle 145.

In both embodiments, the light values sampled at the emitting triangles are merged with their respective primary hit points to reconstruct the reflection of the object in the receiving triangle. Finally, the merged results are delivered to the image pixels on the screen, together with other receiver triangles.

Coherence of secondary rays. A coherence of secondary rays is achieved in the disclosure due to the collective way they are created and processed. In prior art the secondary rays are created in a direct continuation of primary rays, they bounce where the primary rays hit. According to one embodiment, secondary rays are decoupled from primary rays. They are created and processed independently (e.g. for reflection, color bleeding, ambient occlusion, shadow, etc.) of primary rays. However, when done, the data generated by a secondary ray is merged with the data of its counterpart primary ray and transferred to the corresponding image pixel. That is, primary and secondary rays are working asynchronously to each other, but their collected data is finally merged. The same applies to the relation between ternary and secondary rays, and for higher order of rays as well.

Figure 10:
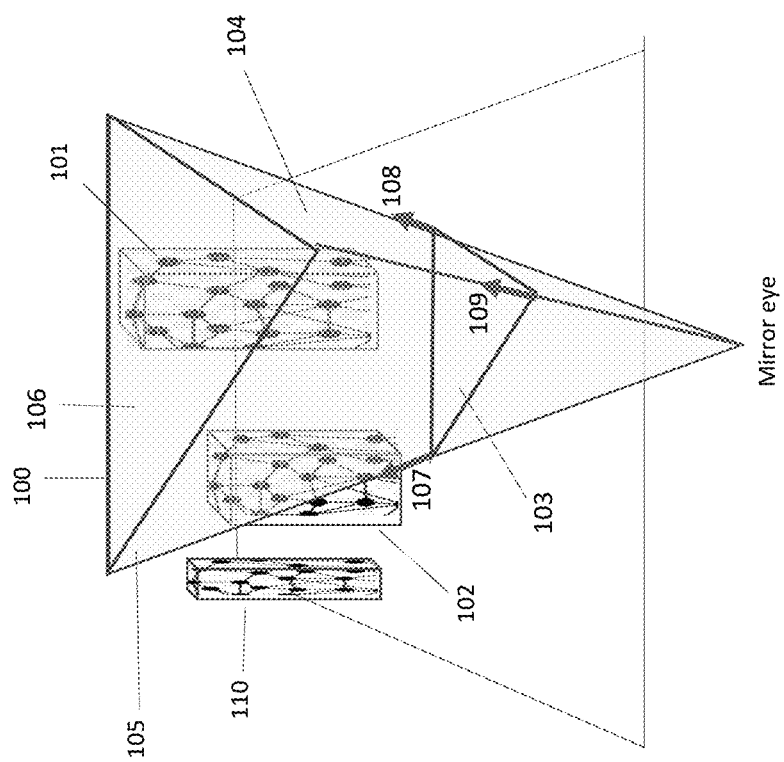
FIG. 10. Frustum from receiver triangle.

The decoupling between primary and secondary rays allows handling of secondary rays in a package, such as a frustum projection of rays 104-106 in FIG. 10. They all are shot from a joint origin, like the receiver triangle 103, often hitting similar scene objects e.g. 101 and 102, and traversing similar parts of the accelerating data structure, e.g. 123 of FIG. 12. The result of joined pathways of secondary rays is high coherence, which is a long-felt need in ray tracing. The secondary rays of the disclosure are coherent because they all belong to the same frustum, that is they all commence at the same triangle and take about the same direction. The coherent handling of secondary rays attains high parallelism and high utilization of GPU.

Computing system. FIG. 15 shows a computing system 156 for an efficient ray tracing in accordance with the embodiments of the disclosure. A various architecture and functionality of the previous embodiments can be implemented. As shown, a system is provided including at least one host processor 150 which connects to communication bus 155. The system also includes host memory 151. Software and data are stored in the main memory which may take the form of RAM. The system also includes a graphics system, having a graphics processor (GPU) 152 and a display 153. The GPU has a plurality of shaders, rasterization module, etc. The embodiments are best suited for GPU. The coherence of secondary rays achieved in the disclosure attains high utilization of GPU.

In one embodiment the graphics processor is a discrete GPU having its own video memory and hosted by a CPU. In another embodiment the GPU may be integrated in a single chip with CPU cores, sharing the memory. Similarly, in one embodiment, the foregoing modules may be situated in a semiconductor platform like an FPGA and/or other reconfigurable device. As an option these devices may be in-socket devices. The system 156 may include a secondary storage 154 as well. Further, while not shown, the system 156 may be coupled to a network (e.g. internet, LAN, WAN) for communication purposes.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

While various embodiments have been described above, it should be understood that they have been presented by way of example only, and not limitations. Thus, the breath and scope of a preferred embodiment should be defined only in accordance with the following claims and their equivalents.

What is claimed is:

1. A computer-based method for hybrid ray tracing of non-planar surface reflections, created by coherent secondary rays shot at a scene's geometric objects, wherein secondary rays are decoupled from primary rays, comprising:
   a) identifying, independently of primary rays, a non-planar reflective surface in a scene to reflect a plurality of geometric objects;
   b) identifying the plurality of geometric objects in the scene; and
   c) at each triangle of the non-planar reflective surface:
      creating a frustum directed at the plurality of geometric objects, wherein vertices of the frustum are guided by normal vectors of the triangle;
      generating a packet of secondary rays bounded by the frustum and shot from the triangle toward the plurality of geometric objects; and
      traversing the packet of secondary rays in an accelerating structure as a packets of coherent rays.

2. The method of claim 1, wherein the secondary rays comprise a coherent packet of rays.

3. The method of claim 1, wherein the frustum has a shape of a triangular pyramid based at the triangle of the non-planar reflective surface.

4. The method of claim 1, wherein the frustum is shot from the triangle toward the plurality of geometric objects for exploring visibility.

5. The method of claim 1 wherein said traversing improves efficiency of intersection tests by culling invisible geometric objects.

6. The method of claim 1, wherein all secondary rays shot from each triangle of the non-planar reflective surface traversing the accelerating structure have one common origin and mutually close destinations.

7. The method of claim 6, wherein the common origin and the mutually close destinations makes the secondary rays coherent.

8. The method of claim 7, wherein the coherence of the secondary rays is gained due to the collective way they are created, allowing their processing in packets.

9. The method for hybrid ray tracing of claim 1, wherein the shooting of secondary rays is done independently of an image generated by the primary rays.

10. The method of claim 1, wherein the secondary rays are created and processed independently of a rasterized image, while their resulting data is merged with the rasterized image.

11. The method of claim 2, wherein the way of processing the secondary rays independently of the rasterized image applies also to rays of higher order.

12. The method of claim 1, wherein reconstruction of the accelerating structure is performed by local updates.

13. The method of claim 12, wherein the local updates of the accelerating structure enable fast animation of each of the geometric objects or part thereof in the scene.

14. The method of claim 1, wherein the coherence of the secondary rays enables high parallelism of traversals through hierarchies of the accelerating structure.

15. The method of claim 14, wherein the coherence of the secondary rays enables high utilization of a graphics processing unit.

* * * * *

UNITED STATES PATENT AND TRADEMARK OFFICE
CERTIFICATE OF CORRECTION

PATENT NO. : 10,991,147 B1
APPLICATION NO. : 16/874705
DATED : April 27, 2021
INVENTOR(S) : Reuven Bakalash It is certified that error appears in the above-identified patent and that said Letters Patent is hereby corrected as shown below:

In the Claims

Claim 1, Column 13, Line 19, instead of "packets" should be – packet –;
Claim 7, Column 14, Line 4, instead of "makes" should be – make –;
Claim 11, Column 14, Line 17, instead of "claim 2" should be – claim 10 –.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*